US012436538B2

(12) United States Patent
Chen et al.

(10) Patent No.: US 12,436,538 B2
(45) Date of Patent: Oct. 7, 2025

(54) METHOD AND SYSTEM FOR ENVIRONMENT MAINTENANCE

(71) Applicant: URSrobot AI Inc., Taipei (TW)

(72) Inventors: Chien-Tung Chen, Taipei (TW); Chung-Hou Wu, Taipei (TW); Chao-Cheng Chen, Taipei (TW); Wen-Wei Chiang, Taipei (TW); Yi-Jin Lin, Taipei (TW)

(73) Assignee: URSrobot AI Inc., Taipei (TW)

( * ) Notice: Subject to any disclaimer, the term of this patent is extended or adjusted under 35 U.S.C. 154(b) by 306 days.

(21) Appl. No.: 18/309,614

(22) Filed: Apr. 28, 2023

(65) Prior Publication Data

US 2023/0359219 A1 Nov. 9, 2023

(30) Foreign Application Priority Data

May 3, 2022 (TW) ................................ 111116686

(51) Int. Cl.
*G05D 1/00* (2024.01)

(52) U.S. Cl.
CPC .......... *G05D 1/0274* (2013.01); *G05D 1/028* (2013.01); *G05D 1/0291* (2013.01)

(58) Field of Classification Search
CPC .... G05D 1/0274; G05D 1/028; G05D 1/0291; G05D 1/2297; G05D 2105/15; G05D 2107/21; G05D 1/6484; G05D 1/6987; G05D 2109/10
See application file for complete search history.

(56) References Cited

U.S. PATENT DOCUMENTS

2018/0143634 A1* 5/2018 Ott ...................... G05D 1/0297

FOREIGN PATENT DOCUMENTS

CN 106489103 A 3/2017
CN 108628314 A 10/2018

OTHER PUBLICATIONS

Search Report appended to an Office Action, which was issued to Taiwanese counterpart application No. 111116686 by the TIPO on May 24, 2023, with an English translation thereof (2 pages).

* cited by examiner

*Primary Examiner* — Abby Lin
*Assistant Examiner* — Renee LaRose
(74) *Attorney, Agent, or Firm* — HSML P.C.

(57) ABSTRACT

A robot system is used to trace and record boundaries of multiple sites, and data of the recorded boundaries are transmitted to a server for storage therein. The server computes moving paths for the sites based on the data of the recorded boundaries. Upon receipt of a setting signal from a mobile device that indicates a selected robot and a target site, the server transmits a maintenance instruction that includes the boundary and the moving path for the target site to the selected robot, so that the selected robot performs maintenances on the target site based on the maintenance instruction.

10 Claims, 7 Drawing Sheets

METHOD AND SYSTEM FOR ENVIRONMENT MAINTENANCE

CROSS-REFERENCE TO RELATED APPLICATION

This application claims priority of Taiwanese Invention Patent Application No. 111116686, filed on May 3, 2022.

FIELD

The disclosure relates to a control method and a system, and more particularly to a method and a system for environment maintenance.

BACKGROUND

Conventionally, a movable robot (e.g., a weeding robot) is controlled by a specific control device (e.g., a remote controller), and stores boundary information for only one predetermined site, so the movable robot can only perform related operations (e.g., weeding operation) on that site. That is to say, the movable robot and the control device are bound to each other, so the movable robot cannot be controlled using another control device. In such a configuration, a working range of the movable robot is limited to the predetermined site. In addition, a working status of the movable robot cannot be acquired remotely, which is inconvenient.

SUMMARY

Therefore, an object of the disclosure is to provide an environment maintenance method that can alleviate at least one of the drawbacks of the prior art.

According to the disclosure, the method of using a robot system that includes a plurality of movable robots to perform environment maintenance is provided to include steps of: A) by at least one of the movable robots, tracing and recording boundaries of multiple to-be-maintained sites; B) by the robot system, transmitting data of the boundaries to a server for storage therein; C) by the server, computing a plurality of moving paths respectively for the to-be-maintained sites based on the data of the boundaries; D) by the server, establishing a lookup table that records correspondences among the to-be-maintained sites, the boundaries and the moving paths; E) by the server, receiving a setting signal that is generated and transmitted by a mobile device, the setting signal indicating a target site that is one of the to-be-maintained sites, and a selected robot that is one of the movable robots; F) by the server based on the setting signal and the lookup table, generating a maintenance instruction that includes a target site boundary and a target moving path, wherein the target site boundary is one of the boundaries that corresponds to the target site, and the target moving path is one of the moving paths that corresponds to the target site; and G) by the server, transmitting the maintenance instruction to the selected robot as indicated by the setting signal to make the selected robot perform maintenance on the target site.

Another object of this disclosure is to provide an environment maintenance system that can alleviate at least one of the drawbacks of the prior art.

According to the disclosure, the system includes a robot system and a server. The robot system includes a plurality of movable robots, at least one of which is used to trace and record boundaries of multiple to-be-maintained sites. The server is communicatively connected to the robot system via a network, receives and stores data of the boundaries from the robot system via the network, and is configured to compute a plurality of moving paths respectively for the to-be-maintained sites based on the data of the boundaries, and to establish a lookup table that records correspondences among the to-be-maintained sites, the boundaries and the moving paths. The server is configured to receive a setting signal that is generated and transmitted by a mobile device via the network, and the setting signal indicates a target site that is one of the to-be-maintained sites and further indicates a selected robot that is one of the movable robots. The server is configured to generate a maintenance instruction that indicates a target site boundary and a target moving path based on the setting signal and the lookup table. The target site boundary is one of the boundaries that corresponds to the target site, and the target moving path being one of the moving paths that corresponds to the target site. The server is configured to transmit the maintenance instruction to the selected robot as indicated by the setting signal to make the selected robot perform maintenance on the target site.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
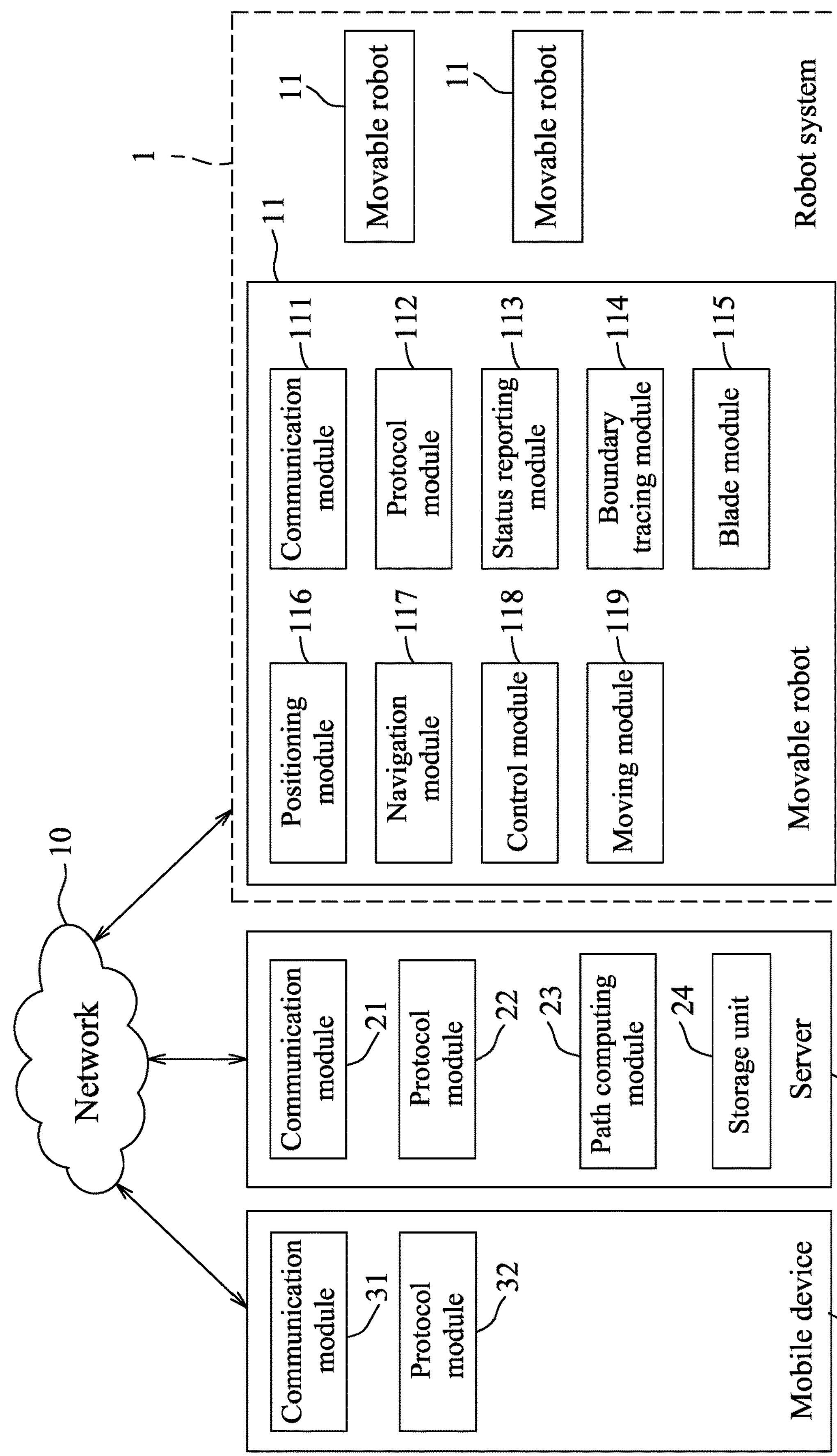
FIG. 1 is a block diagram illustrating an embodiment of an environment maintenance system according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, an embodiment of an environment maintenance system according to this disclosure includes a robot system 1, a server 2 that is communicatively connected to the robot system 1 via a network 10 (e.g., the Internet), and a mobile device 3 that is held by a user and that is communicatively connected to the server 2 via the network 10. In this embodiment, the server 2 is a cloud server, and the mobile device 3 may be, for example, a smartphone, a tablet computer, or a notebook computer, but this disclosure is not limited to such.

The robot system 1 includes a plurality of movable robots 11, at least one of which is used to trace and record boundaries respectively of multiple to-be-maintained sites. In some embodiments, the user may control every single one of the movable robots 11 to trace and record the boundaries of the to-be-maintained sites. In some embodiments, the user may control only one or only some of the movable robots 11 to trace and record the boundaries of the to-be-maintained sites. In some embodiments, the movable robots 11 may be, for example, weeding robots, sweeping robots, other types of robots, or any combination thereof.

In this embodiment, the movable robots 11 are weeding robots, each of which includes a communication module 111 (e.g., a long term evolution (LTE) module), a protocol module 112, a status reporting module 113, a boundary tracing module 114, a blade module 115, a positioning module 116, a navigation module 117, a control module 118 and a moving module 119.

The protocol module 112 is communicatively connected to the communication module 111, the status reporting module 113, the boundary tracing module 114 and the navigation module 117, so the status reporting module 113, the boundary tracing module 114 and the navigation module 117 can send data to the server 2 through the protocol module 112, the communication module 111 and the network 10. The protocol module 112 is configured to convert electric signals and/or commands into a format for use by the communication module 111, and to convert signals and/or commands received from the communication module 111 into a format for use by other modules of the movable robot 11 (namely, performing protocol conversion), and to transmit the data of the boundary or boundaries of the to-be-maintained site(s) recorded by the boundary tracing module 114 (which will be introduced hereinafter) to the server 2 via the communication module 111 and the network 10.

The status reporting module 113 is communicatively connected to the protocol module 112, the navigation module 117 and the control module 118, and is configured to collect operation results of other elements of the movable robot 11 to generate a working status of the movable robot 11, and to report the working status of the movable robot 11 to the server 2 through the protocol module 112, the communication module 111 and the network 10.

The boundary tracing module 114 is configured to receive and record data from the positioning module 116, so as to trace and record the boundary or boundaries of one or more of the to-be-maintained sites. When the server 2 requests the data of the boundary or boundaries recorded by the boundary tracing module 114, the boundary tracing module 114 may send the requested data to the server 2 through the protocol module 112, the communication module 111 and the network 10.

The blade module 115 is configured to cut weeds, and may include, for example but not limited to, a weed cutter. In some embodiments where the movable robot 11 is another type of robot (e.g., a sweeping robot), the blade module 115 may be replaced by another environment maintenance module (e.g., a vacuum cleaner module, a brush module, etc.).

The positioning module 116 is used to continuously or periodically acquire a current coordinate set that represents a current location of the movable robot 11, and is electrically connected to the navigation module 117 and the control module 118 for transmitting the current coordinate set thereto. The positioning module 116 may include, for example but not limited to, a global navigation satellite system (GNSS), such as a real-time kinematic (RTK) module, a global positioning system (GPS) module, etc.

The navigation module 117 is communicatively connected to the protocol module 112, the status reporting module 113, the positioning module 116 and the control module 118, and is configured to perform navigation in response to a navigation command received from the server 2 through the network 10, the communication module 111 and the protocol module 112, and to transmit a path point coordinate set of a moving path to the control module 118, so the control module 118 can control operation of the moving module 119 to make the movable robot 11 move toward the path point coordinate set.

The control module 118 is communicatively connected to the status reporting module 113, the positioning module 116 and the moving module 119, and is configured to control and drive operation of the moving module 119.

The moving module 119 is configured to move, based on a driving signal received from the control module 118, toward a location indicated by the driving signal. In some embodiments, the moving module 119 may include, for example, a motor and several wheels, but this disclosure is not limited in this respect.

In some embodiments, the protocol module 112, the status reporting module 113, the boundary tracing module 114, the navigation module 117 and the control module 118 may be realized as program codes that, when executed by a processor or a microcontroller (not shown) of the movable robot 11, cause the processor or the microcontroller to perform the operations as described above and hereinafter.

The mobile device 3 includes a communication module 31 (e.g., an LTE module), and a protocol module 32 that is electrically connected to the communication module 31. In some embodiments, the protocol module 32 may be, for example, coupled to a user interface (not shown) that is configured for the user to input messages, settings and/or instructions, and may be realized as program codes to be executed by a processor (not shown) of the mobile device 3. In this embodiment, the user may input setting data through the protocol module 32 to select one of the to-be-maintained sites to be a target site, and to select one of the movable robots 11 (referred to as selected robot hereinafter) to perform maintenance on the target site, and in response to the input of the setting data, the protocol module 32 generates a setting signal that indicates the target site and the selected robot. In practice, the to-be-maintained sites may each be assigned a unique site label, and the movable robots 11 may each be assigned a unique robot label, so as to facilitate user selection of the target site and the selected robot from among the to-be-maintained sites and the movable robots 11 through the protocol module 32. The protocol module 32 transmits the setting signal to the server 2 through the communication module 31 and the network 10.

The server 2 includes a communication module 21 (e.g., a network adapter that is connected to the network 10 through wired connection), a protocol module 22, a path computing module 23 and a storage unit 24. The protocol module 22 is communicatively connected to the communication module 21, the path computing module 23 and the storage unit 24, and is communicatively connected to the communication module 111 of each of the movable robots 11 through the communication module 21 and the network 10, so as to receive the data of the boundaries of the to-be-maintained sites from the movable robots 11. The protocol module 22 is also communicatively connected to the communication module 31 of the mobile device 3 through the communication module 21 and the network 10, so as to receive the setting signal from the mobile device 3, and is configured to convert electric signals into a format for use by the communication module 21, and to convert signals received from the communication module 21 into a format for use by other modules of the server 2. The protocol module 22 stores the data of the boundaries of the to-be-maintained sites into the storage unit 24, and transmits the data of the boundaries of the to-be-maintained sites to the path computing module 23. The path computing module 23 is communicatively connected to the storage unit 24, computes a plurality of moving paths respectively for the to-be-maintained sites based on the data of the boundaries, and stores the moving paths in the storage unit 24. In some embodiments, the protocol module 22 and the path computing module 23 may be realized as program codes that, when executed by a processor (not shown) of the server 2, cause the processor to perform the operations as mentioned above and hereinafter. The processor of the server 2 is also configured to establish a lookup table that records correspondences among the to-be-maintained sites, the boundaries and the moving paths, and to store the lookup table in the storage unit 24. In some embodiments, the storage unit 24 may be realized using, for example, flash memory, hard disk drives, solid state drives, other types of non-transitory storage media, or any combination thereof. The server 2 uses the lookup table to search for one of the boundaries and one of the moving paths that correspond to the target site as indicated by the setting signal, and generates a maintenance instruction that includes a target site boundary (i.e., said one of the boundaries that corresponds to the target site) and a target moving path (i.e., said one of the moving paths that corresponds to the target site) based on the setting signal and the lookup table (e.g., using the target site as indicated by the setting signal to find out the target site boundary and the target moving path from the lookup table). Then, the server 2 transmits the maintenance instruction to the selected robot as indicated by the setting signal, so as to make the selected robot perform maintenance on the target site.

For example, when the user intends to use the third one of the movable robots 11 (labelled "3") to perform maintenance on the second one of the to-be-maintained sites (labelled "B"), the user may operate the protocol module 32 of the mobile device 3 to generate and transmit the setting signal that indicates the target site "B" and the selected robot "3" to the server 2. The server 2 uses the lookup table to find out the target site boundary and the target moving path that corresponds to the target site "B" as indicated by the setting signal, and generates and transmits the maintenance instruction that includes the target site boundary and the target moving path to the selected robot "3" as indicated by the setting signal, so as to make the selected robot "3" perform maintenance on (e.g., by weeding) the target site "B".

Figure 2:
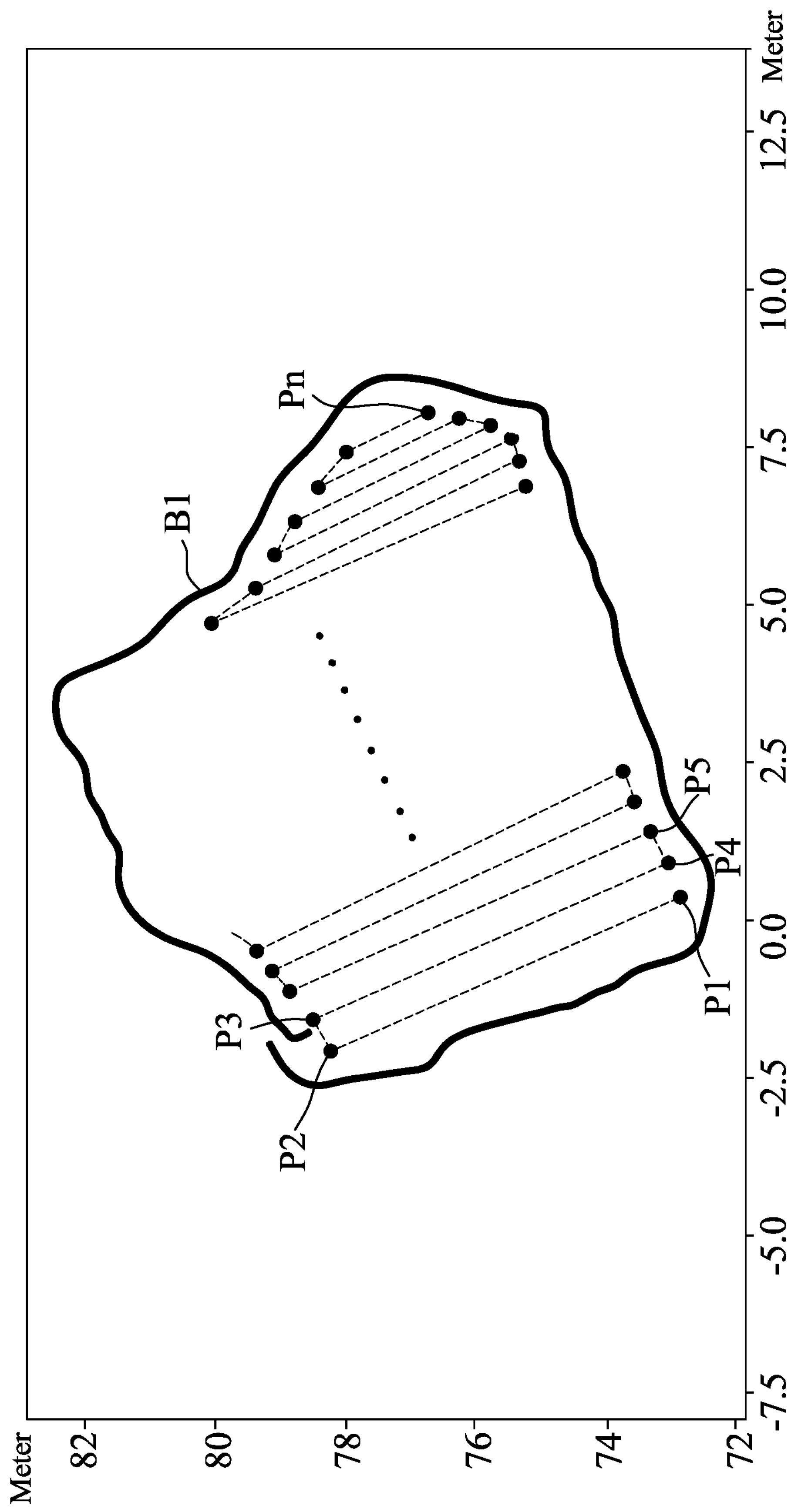
FIG. 2 is a schematic diagram illustrating a boundary and a moving path that correspond to a to-be-maintained site.

It is noted that the techniques for computing the moving paths based on the boundaries of a site should be familiar to one having ordinary skill in the art, so details thereof are omitted herein for the sake of brevity. FIG. 2 exemplarily illustrates a boundary of a site recorded in a universal transverse Mercator (UTM) projection system, where the recorded boundary includes a plurality of boundary coordinate sets that are connected in sequence to form a boundary line B1, and the moving path that is computed based on the boundary line B1 includes a plurality of path point coordinate sets P1 through Pn.

FIGS. 3 through 7 cooperatively illustrate an embodiment of a flow of an environment maintenance method according to this disclosure. In this embodiment, the environment maintenance system records the boundaries of the to-be-maintained sites, and has the selected robot perform weeding on the target site.

In step 40, the robot system 1 traces and records the boundaries respectively of the to-be-maintained sites. The user may select one or more of the movable robots 11 to trace and record the boundaries of the to-be-maintained sites. In this embodiment, a single movable robot 11 is used to trace and record the boundary of every to-be-maintained site, and the boundary of each to-be-maintained site is required to be traced and recorded only once before the to-be-maintained site is weeded for the first time, but this disclosure is not limited to such. In practice, the user may operate the protocol module 32 of the mobile device 3 to send a boundary tracing instruction to the server 2 via the communication module 31 and the network 10, and the server 2 would then request the selected one of the movable robots 11 as indicated by the boundary tracing instruction (referred to as tracing robot hereinafter) to trace and record the boundaries of the to-be-maintained sites. In a case that the tracing robot is requested to trace and record the boundary of one of the to-be-maintained sites, when the protocol module 112 of the tracing robot receives the boundary tracing instruction through the communication module 111 of the tracing robot, the protocol module 112 transmits the boundary tracing instruction to the control module 118 of the tracing robot, so that the control module 118 traces and records the boundaries of said one of the to-be-maintained sites based on the boundary tracing instruction while the moving module 119 is driven by the control module 118 to move the tracing robot along the boundary of said one of the to-be-maintained sites in response to a remote control input from the user. As the tracing robot moves along the boundary of said one of the to-be-maintained sites, the positioning module 116 of the tracing robot acquires and transmits multiple coordinate sets of the boundary (referred to as boundary coordinate sets) to the boundary tracing module 114 of the tracing robot, and the boundary tracing module 114 connects the boundary coordinate sets in sequence to form the boundary line (see "B1" in FIG. 2) that defines a working area for the movable robots 11 to work in the future. In some embodiments, the user may provide the boundary tracing instruction directly to the tracing robot by establishing direct communication between the mobile device 3 and the tracing robot, or by directly operating the tracing robot to enter the boundary tracing instruction, and then manually bringing the tracing robot along the boundary of said one of the to-be-maintained sites, so the positioning module 116 can acquire the boundary coordinate sets. However, this disclosure is not limited in this respect.

In step 41, one or more of the movable robots 11 transmit the data of the boundaries of the to-be-maintained sites to the server 2 for storage therein. In detail, for each tracing robot, the boundary tracing module 114 transmits the data of each boundary thus recorded to the path computing module 23 of the server 2 through the protocol module 112, the communication module 111, the network 10, the communication module 21 and the protocol module 22, and then the path computing module 23 stores the data of the boundaries received from the tracing robot(s) into the storage unit 24.

In step 42, the path computing module 23 computes the moving paths respectively for the to-be-maintained sites based on the data of the boundaries of the to-be-maintained sites.

In step 43, server 2 establishes the lookup table that records the correspondences among the to-be-maintained sites, the boundaries of the to-be-maintained sites, and the moving paths that are computed for the to-be-maintained sites.

In step 44, the mobile device 3 generates the setting signal in response to user operation, and transmits the setting signal to the server 2.

In step 45, the processor of the server 2 uses the lookup table to generate, based on the setting signal, the maintenance instruction that includes the target site boundary and the target moving path.

In step 46, the processor of the server 2 transmits the maintenance instruction to the selected robot as indicated by the setting signal.

In step 47, the selected robot performs maintenance on the target site (i.e., perform weeding in this example) according to the target site boundary and the target moving path included in the maintenance instruction, and generates and transmits working status information to the server 2 for storage in the storage unit 24, wherein the working status information indicates a working status of the selected robot.

Figure 4:
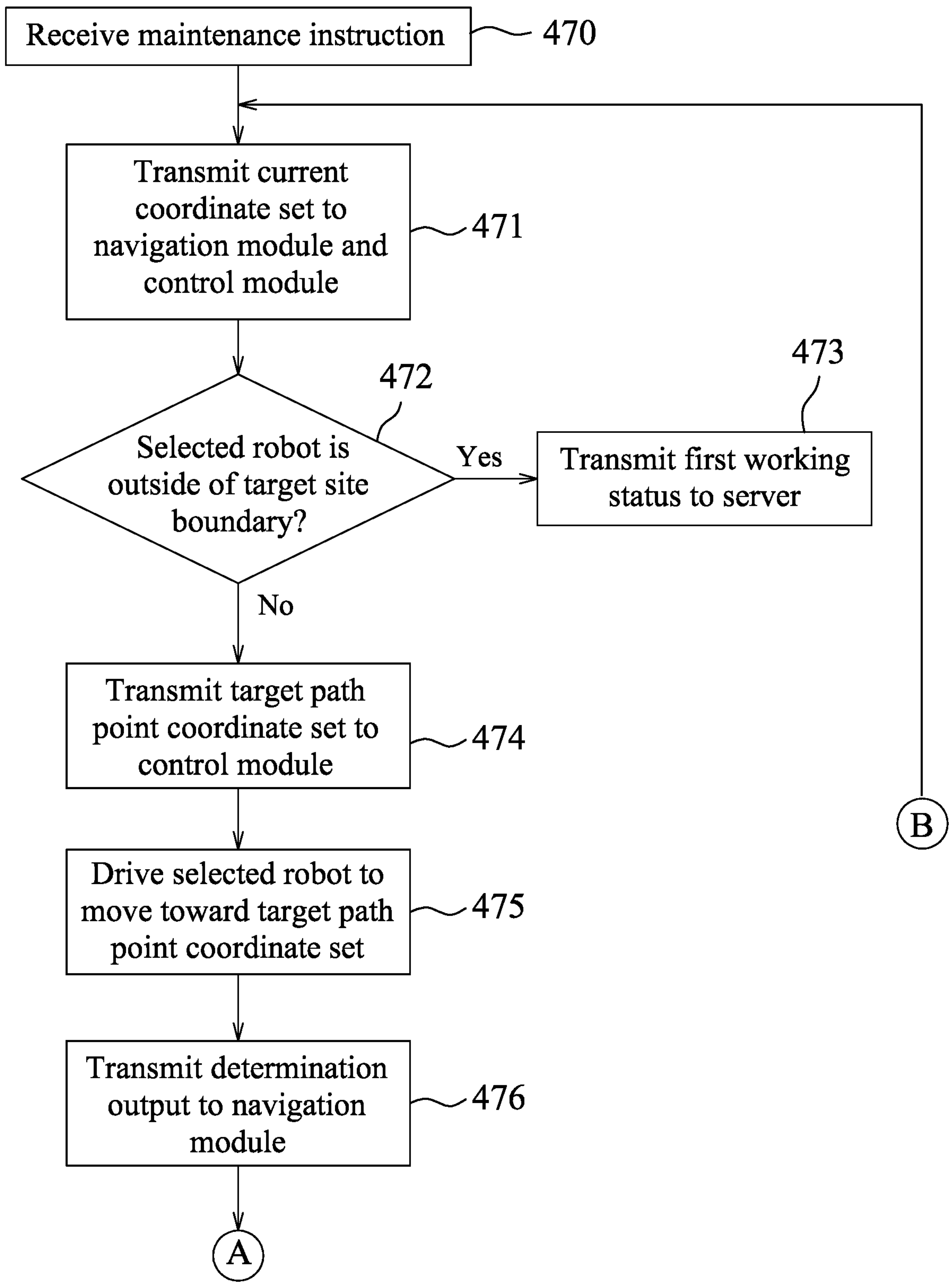
Figure 5:
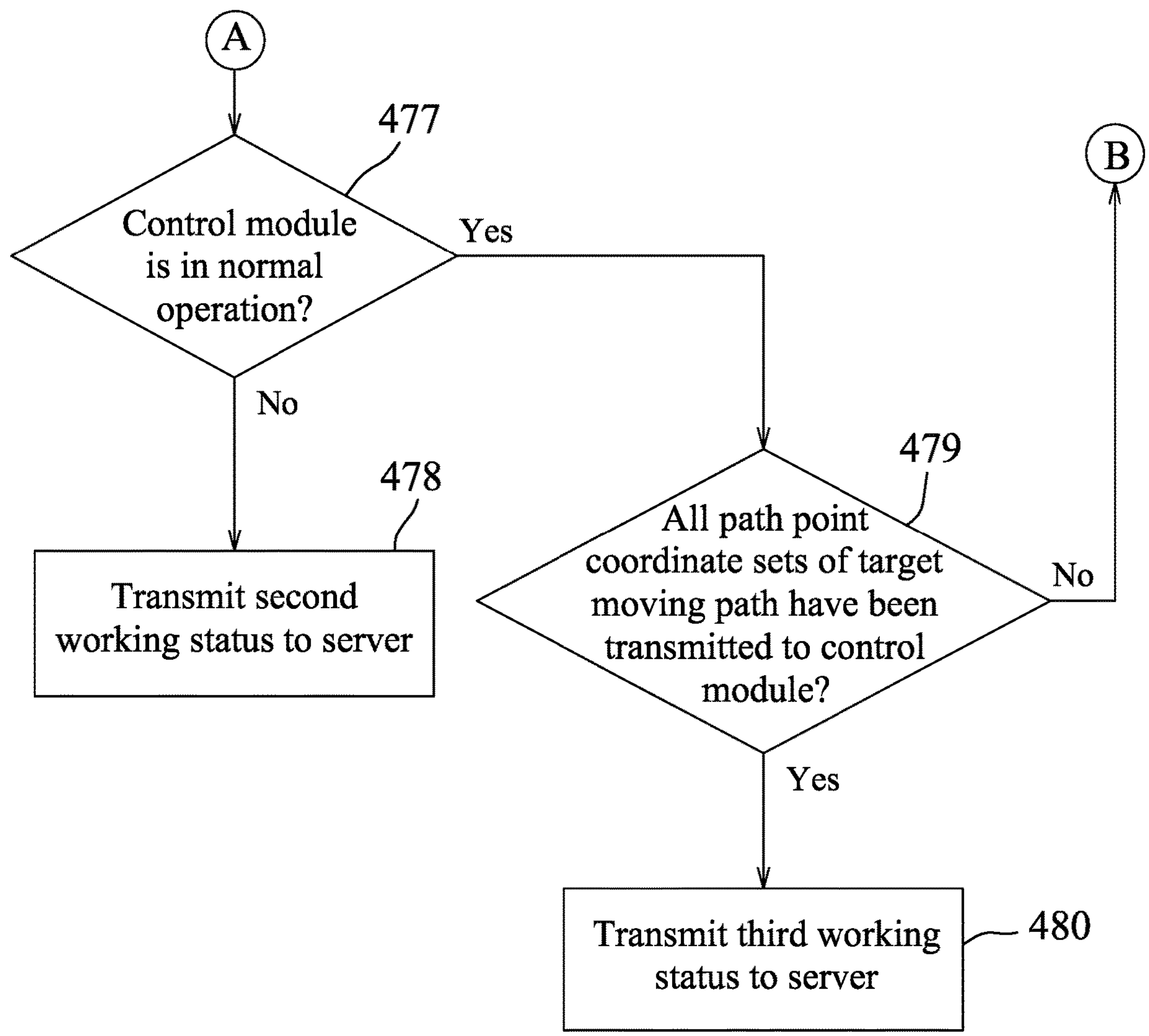

FIGS. 4 and 5 illustrate details of step 47, which will be described with respect to the selected robot. In sub-step 470, the navigation module 117 receives the maintenance instruction thorough the communication module 111 and the protocol module 112.

In sub-step 471, the positioning module 116 acquires a first coordinate set that represents a location of the selected robot at a time the navigation module 117 received the maintenance instruction, and transmits the first coordinate set to the navigation module 117 and the control module 118.

In sub-step 472, the navigation module 117 determines, based on the first coordinate set and the boundary coordinate sets of the target site boundary, whether the selected robot is outside of the target site boundary. The flow goes to sub-step 473 when the determination is affirmative, and goes to sub-step 474 when otherwise.

In sub-step 473, the navigation module 117 causes the status reporting module 113 to generate and transmit the working status information that includes a first working status to the server 2. The first working status indicates that the selected robot is outside of the target site boundary. In this embodiment, the status reporting module 113 transmits the working status information to the server 2 through the protocol module 112, the communication module 111, the network 10, the communication module 21 and the protocol module 22, so the server 2 can store the working status information in the storage unit 24.

In sub-step 474, the navigation module 117 transmits a target path point coordinate set to the control module 118, where the target path point coordinate set is one of the path point coordinate sets of the target moving path. In this embodiment, as the selected robot performs maintenance on the target site, the path point coordinate sets of the target moving path will take turns serving as the target path point coordinate set and be transmitted to the control module 118 one at a time in sequence.

Figure 6:
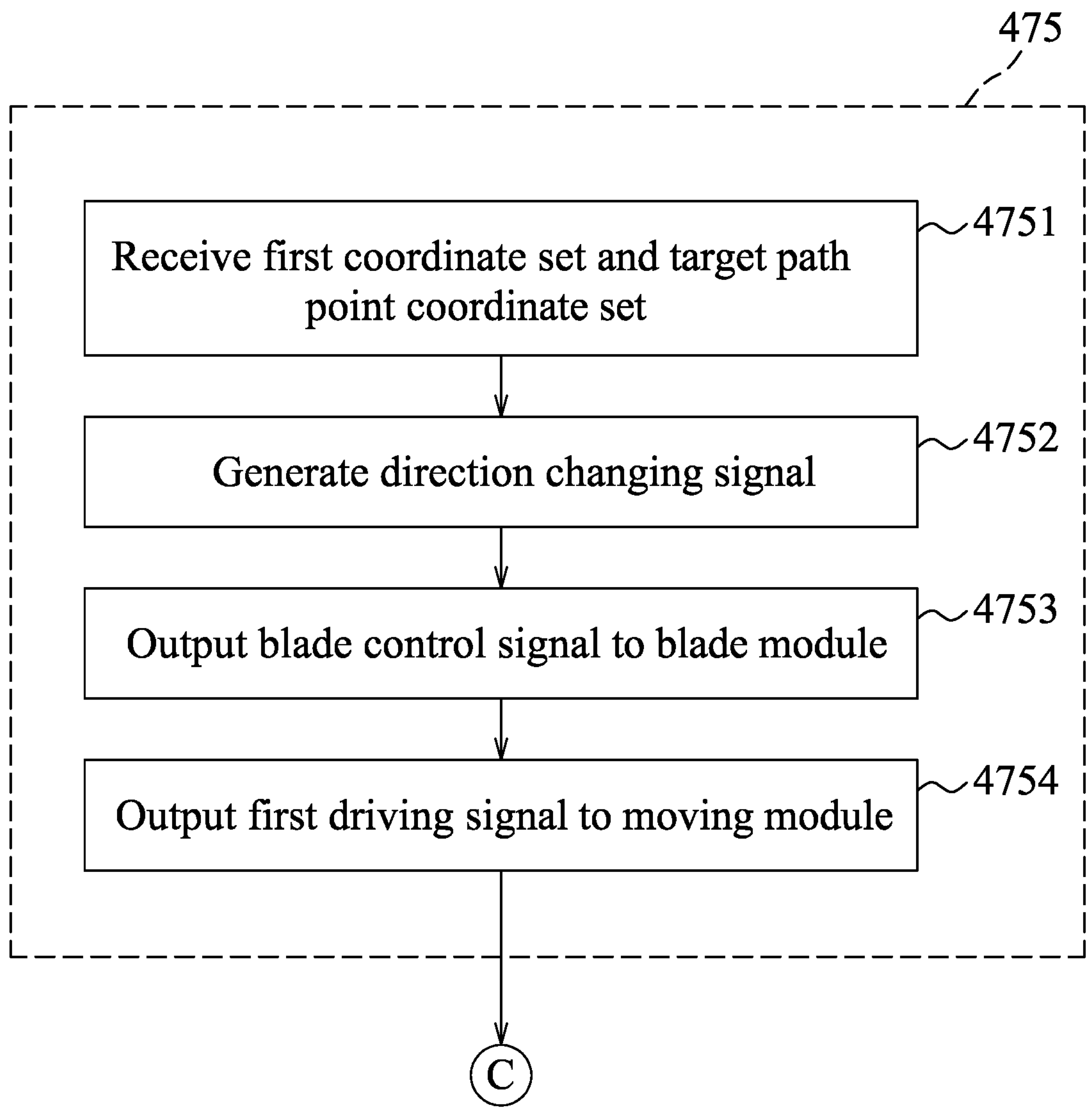

In sub-step 475, the control module 118 drives the selected robot to move based on the target path point coordinate set. FIG. 6 illustrates details of sub-step 475.

In sub-step 4751, the control module 118 receives the first coordinate set and the target path point coordinate set from the positioning module 116 and the navigation module 117, respectively.

In sub-step 4752, the control module 118 generates, based on the first coordinate set and the target path point coordinate set, a direction changing signal that is to direct the selected robot currently located at the first coordinate set to face a direction of the target path point coordinate set.

In sub-step 4753, the control module 118 generates and outputs a maintenance control signal (e.g., a blade control signal in this embodiment) to the blade module 115 to drive operation of the blade module 115 (e.g., to start rotating a cutter blade).

In sub-step 4754, based on the direction changing signal and the target path point coordinate set, the control module 118 generates and outputs a first driving signal to the moving module 119, so that the moving module 119 is driven to make the selected robot move toward the target path point coordinate set.

Figure 7:
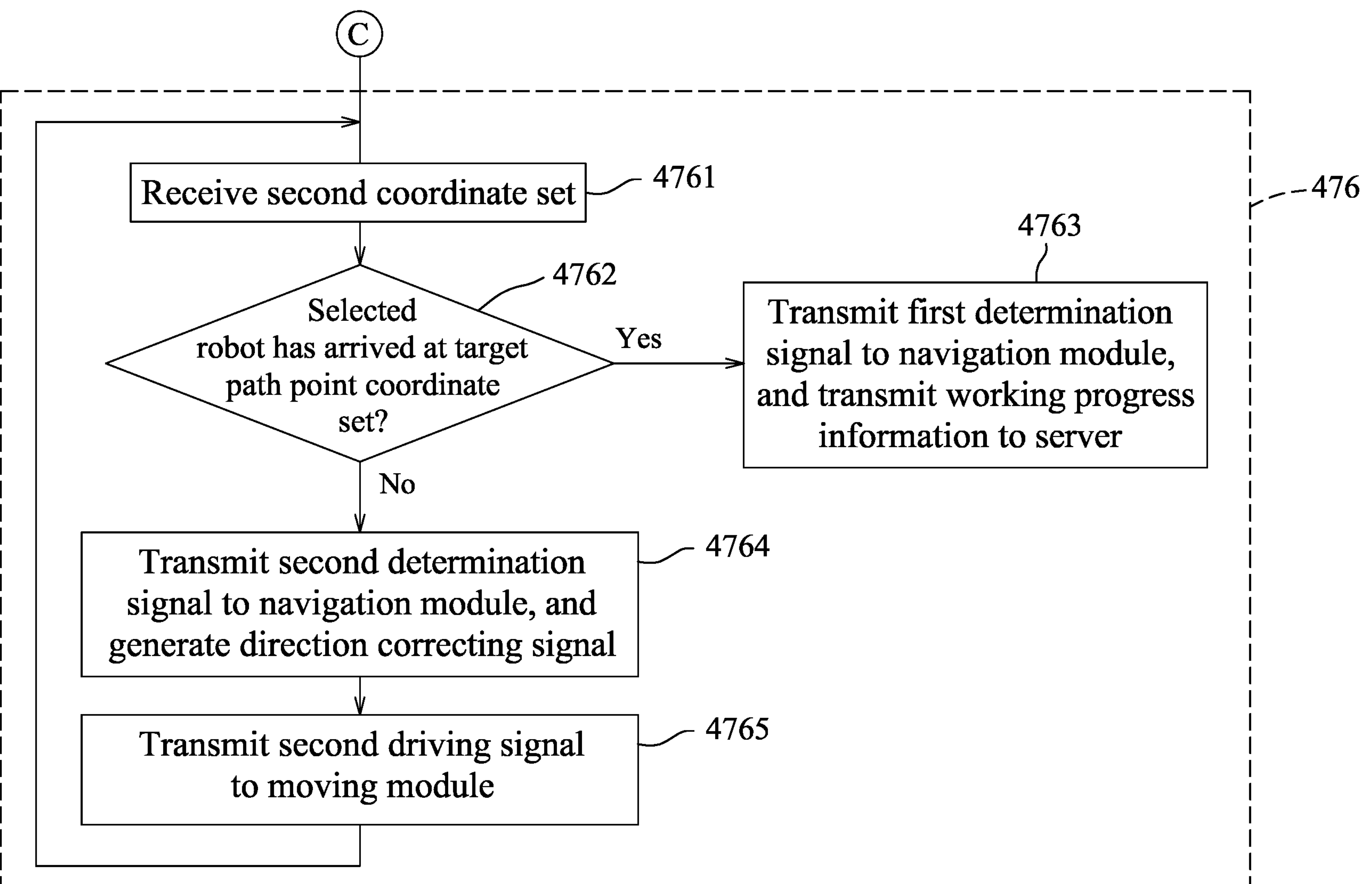

Referring to FIGS. 1 and 4 again, in sub-step 476, the control module 118 generates a determination output based on the target path point coordinate set and a second coordinate set, and transmits the determination output to the navigation module 117. The second coordinate set is acquired by and received from the positioning module 116 and represents a location of the selected robot at a time after the selected robot has been driven to move toward the target path point coordinate set, and the determination output indicates whether the selected robot has arrived at the target path point coordinate set. FIG. 7 illustrates details of sub-step 476, which are described with respect to the control module 118 of the selected robot.

In sub-step 4761, the control module 118 receives the second coordinate set. To be specific, the second coordinate set may be acquired by the positioning module 116 a length of time after the selected robot started to move toward the target path point coordinate set, wherein the length of time is presumably sufficient for the selected robot to arrive at the target path point coordinate set.

In sub-step 4762, the control module 118 determines, based on the second coordinate set, whether the selected robot has arrived at the target path point coordinate set. The flow goes to sub-step 4763 when the determination is affirmative, and goes to sub-step 4764 when otherwise.

In sub-step 4763, the control module 118 generates and transmits the determination output that includes a first determination signal to the navigation module 117, and causes the status reporting module 113 to generate and transmit working progress information indicating that the selected robot has arrived at the target path point coordinate set to the server 2 for storage in the storage unit 24. The first determination signal indicates that the control module 118 is in normal operation.

In sub-step 4764, the control module 118 generates and transmits the determination output that includes a second determination signal to the navigation module 117, and generates a direction correcting signal based on the second coordinate set and the target path point coordinate set. The second determination signal indicates that the control module 118 is not in normal operation, and the direction correcting signal is to direct the selected robot currently located at the second coordinate set to face a direction of the target path point coordinate set.

In sub-step 4765, based on the direction correcting signal and the target path point coordinate set, the control module 118 generates and outputs a second driving signal to the moving module 119, so that the moving module 119 is driven to correct a moving direction of the selected robot. Then, after a length of time that is presumably sufficient for the selected robot to arrive at the target path point coordinate set has elapsed, the flow returns to sub-step 4761, where the control module 118 receives another coordinate set that is newly acquired by the positioning module 116 and that represents a new, current location of the selected robot for determining whether the selected robot has arrived at the target path point coordinate set.

Referring to FIGS. 1 and 5, in sub-step 477, the navigation module 117 determines, based on the determination output, whether the control module 118 is in normal operation. The flow goes to sub-step 479 when the determination is affirmative, and goes to sub-step 478 when otherwise. Possible reasons for the control module 118 to not be in normal operation include, for example but not limited to, running out of battery or malfunction.

In sub-step 478, the navigation module 117 causes the status reporting module 113 to generate and transmit the working status information that includes a second working status to the server 2 for storage in the storage unit 24. The second working status indicates that the selected robot has not completed a given task (e.g., arriving at the target path point coordinate set).

In sub-step 479, the navigation module 117 determines whether all of the path point coordinate sets of the target moving path have been transmitted to the control module 118. The flow goes to sub-step 480 when the determination is affirmative, and goes to sub-step 471 for repeating sub-steps 471 to 479 when otherwise. In sub-step 474 of the repetition, the navigation module 117 transmits, to the control module 118, the next one of the path point coordinate sets of the target moving path (i.e., another one of the path point coordinate sets of the target moving path that is next to said one of the path point coordinate sets that served as the target path point coordinate set in the previous instance of sub-step 474) that serves as the target path point coordinate set in the repetition.

In sub-step 480, the navigation module 117 causes the status reporting module 113 to generate and transmit the working status information that includes a third working status to the server 2 for storage in the storage unit 24. The third working status indicates that the selected robot has completed the given task.

Figure 3:
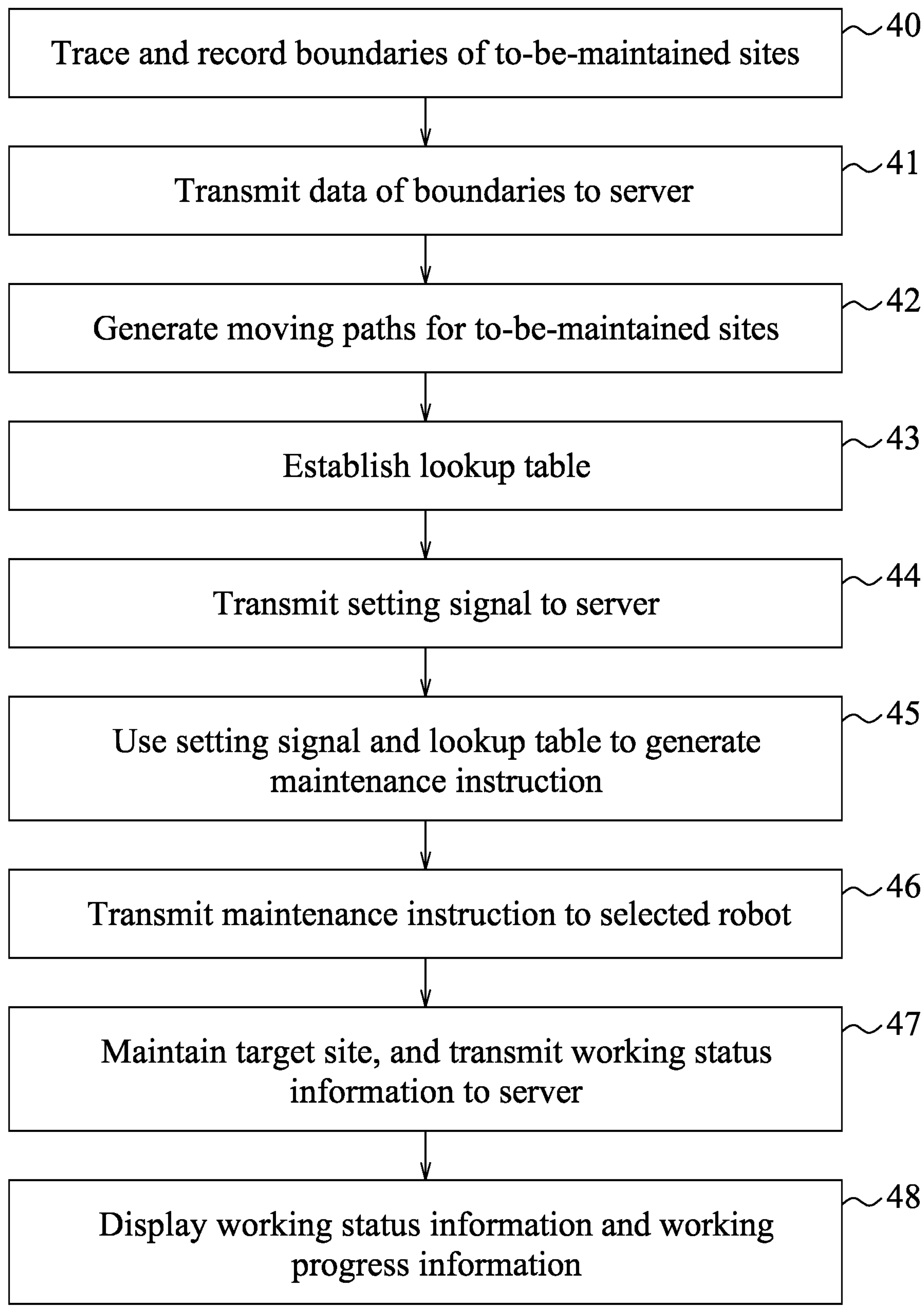
FIGS. 3 through 7 are flow charts illustrating steps of an embodiment of an environment maintenance method according to the disclosure.

Referring to FIGS. 1 and 3, in step 48, the mobile device 3 receives the working progress information and the working status information from the server 2, and displays the working progress information and the working status information. In this embodiment, the protocol module 32 of the mobile device 3 receives the working progress information and the working status information that are stored in the storage unit 24 of the server 2 through the communication module 31, the network 10, the communication module 21 and the protocol module 22.

In summary, in the embodiment of the environment maintenance method according to this disclosure, the server 2 stores the lookup table, the working status information and the working progress information in the storage unit 24. That is, the data of the boundaries of the to-be-maintained sites and the moving paths do not need to be stored in any of the movable robots 11 but are managed by the server 2, so all of the movable robots 11 can share these data, and the user can use any mobile device that is able to communicate with the server 2 to select one of the movable robots 11 to perform maintenance on a selected target site. In such a scenario, different movable robots 11 can be controlled using different mobile devices, and none of the movable robot 11 is limited to a specific site, which is convenient and flexible. The mobile device 3 receives the working progress information and the working status information from the server 2 and displays the same, so the user can acknowledge the working progress and the working status of the selected robot remotely. In addition, the centralized management of the data of the boundaries, the moving paths, the working status information and the working progress information by the server 2 may enable each movable robot 11 to take over the task of another movable robot 11. Assuming that a weeding task is to weed a target site, one of the movable robots 11 may be used on one day to weed a part of the target site, and another one of the movable robots 11 may be used on another day to resume the weeding task and weed the remaining part of the target site. In view of the abovementioned characteristics, a team of robots can be dispatched to achieve high working efficiency, and the malfunction of any of the movable robots 11 will not result in data loss. When the selected robot malfunctions, the user can immediately select another movable robot 11 to perform the desired task by acquiring the data of the target site boundary and the target moving path from the server 2. In other words, because the data of the boundaries and the moving paths are stored in the server 2 rather than stored in only one or some of the movable robots 11 that are used to trace and record the boundaries of the to-be-maintained sites, the desired task will not become inexecutable only because said another robot was not used to trace and record the boundary of the target site.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method of using a robot system that includes a plurality of movable robots to perform environment maintenance, comprising steps of:

A) by at least one of the movable robots, tracing and recording boundaries of multiple to-be-maintained sites;

B) by the robot system, transmitting data of the boundaries to a server for storage therein;

C) by the server, computing a plurality of moving paths respectively for the to-be-maintained sites based on the data of the boundaries;

D) by the server, establishing a lookup table that records correspondences among the to-be-maintained sites, the boundaries and the moving paths;

E) by the server, receiving a setting signal that is generated and transmitted by a mobile device, the setting signal indicating a target site that is one of the to-be-maintained sites, and a selected robot that is one of the movable robots;

F) by the server based on the setting signal and the lookup table, generating a maintenance instruction that includes a target site boundary and a target moving path, wherein the target site boundary is one of the boundaries that corresponds to the target site, and the target moving path is one of the moving paths that corresponds to the target site; and G) by the server, transmitting the maintenance instruction to the selected robot as indicated by the setting signal to make the selected robot perform maintenance on the target site;

wherein said method further comprises, after step G), steps of:

H) by the selected robot, maintaining the target site according to the maintenance instruction, and transmitting working status information that indicates a working status of the selected robot to the server for storage therein; and I) by the server, providing the working status information to the mobile device for display thereby;

wherein each of the movable robots includes a positioning module, a navigation module and a status reporting module, and each of the boundaries thus recorded includes multiple boundary coordinate sets; and wherein step H) includes sub-steps of:

H1) by the navigation module of the selected robot, receiving the maintenance instruction that includes the target site boundary and the target moving path;

H2) by the positioning module of the selected robot, acquiring and transmitting a current coordinate set that represents a current location of the selected robot to the navigation module;

H3) by the navigation module of the selected robot, determining, based on a first coordinate set and the boundary coordinate sets of the target site boundary, whether the selected robot is outside of the target site boundary, wherein the first coordinate set is acquired by and received from the positioning module of the selected robot, and represents a location of the selected robot at a time the navigation module of the selected robot received the maintenance instruction; and H4) by the navigation module of the selected robot, upon determining that the selected robot is outside of the target site boundary, causing the status reporting module of the selected robot to generate and transmit the working status information that includes a first working status to the server for storage therein, wherein the first working status indicates that the selected robot is outside of the target site boundary.

2. The method of claim 1, wherein each of the movable robots further includes a control module, and each of the moving paths includes multiple path point coordinate sets;

wherein, in sub-step H2), the positioning module of the selected robot further transmits the current coordinate set to the control module of the selected robot, and step H) further includes, after sub-step H3), sub-steps of:

H5) upon determining that the selected robot is not outside of the target site boundary, by the navigation module of the selected robot, transmitting a target path point coordinate set to the control module of the selected robot, wherein the target path point coordinate set is one of the path point coordinate sets of the target moving path, and the path point coordinate sets of the target moving path are to take turns serving as the target path point coordinate set and be transmitted to the control module of the selected robot one at a time in sequence;

H6) by the control module of the selected robot, driving the selected robot to move based on the target path point coordinate set;

H7) by the control module of the selected robot, generating a determination output based on the target path point coordinate set and a second coordinate set, and transmitting the determination output to the navigation module of the selected robot, wherein the second coordinate set is acquired by and received from the positioning module of the selected robot and represents a location of the selected robot at a time after the selected robot has been driven to move in sub-step H6), and the determination output indicates whether the selected robot has arrived at the target path point coordinate set;

H8) by the navigation module, determining, based on the determination output, whether the control module of the selected robot is in normal operation; and H9) by the navigation module, upon determining in sub-step H8) that the control module is not in normal operation, causing the status reporting module of the selected robot to generate and transmit the working status information that includes a second working status to the server for storage therein, wherein the second working status indicates that the selected robot has not completed a given task.

3. The method of claim 2, wherein step H) further includes, after sub-step H8), sub-steps of:

H10) by the navigation module of the selected robot, upon determining in sub-step H8) that the control module of the selected robot is in normal operation, determining whether all of the path point coordinate sets of the target moving path have been transmitted to the control module of the selected robot; and H11) by the navigation module of the selected robot, upon determining in sub-step H10) that all of the path point coordinate sets of the target moving path have been transmitted to the control module of the selected robot, causing the status reporting module of the selected robot to generate and transmit the working status information that includes a third working status to the server for storage therein, wherein the third working status indicates that the selected robot has completed the given task;

wherein, when the navigation module of the selected robot determines in sub-step H10) that not all of the path point coordinate sets of the target moving path have been transmitted to the control module, subs-steps H2) to H11) are repeated with another one of the path point coordinate sets of the target moving path that is next to said one of the path point coordinate sets of the target moving path serving as the target path point coordinate set in sub-step H5).

4. The method of claim 2, wherein each of the movable robots includes a moving module and an environment maintenance module, and sub-step H6) includes sub-steps of:

H61) by the control module of the selected robot, receiving the first coordinate set and the target path point coordinate set from the positioning module and the navigation module of the selected robot, respectively;

H62) by the control module of the selected robot, generating, based on the first coordinate set and the target path point coordinate set, a direction changing signal that is to direct the selected robot to face a direction of the target path point coordinate set;

H63) by the control module of the selected robot, generating and outputting a maintenance control signal to the environment maintenance module of the selected robot to drive operation of the environment maintenance module of the selected robot; and H64) by the control module of the selected robot, generating and outputting, based on the direction changing signal and the target path point coordinate set, a first driving signal to the moving module of the selected robot, so that the moving module of the selected robot is driven to make the selected robot move toward the target path point coordinate set.

5. The method of claim 2, wherein sub-step H7) includes sub-steps of:

H71) by the control module of the selected robot, receiving the second coordinate set;

H72) by the control module of the selected robot, determining, based on the second coordinate set, whether the selected robot has arrived at the target path point coordinate set;

H73) by the control module of the selected robot, upon determining in sub-step H72) that the selected robot has arrived at the target path point coordinate set, generating and transmitting the determination output that includes a first determination signal to the navigation module of the selected robot, and causing the status reporting module of the selected robot to generate and transmit working progress information indicating that the selected robot has arrived at the target path point coordinate set to the server for storage therein, wherein the first determination signal indicates that the control module of the selected robot is in normal operation;

H74) by the control module of the selected robot, upon determining in sub-step H72) that the selected robot has not arrived at the target path point coordinate set, generating and transmitting the determination output that includes a second determination signal to the navigation module of the selected robot, and generating a direction correcting signal based on the second coordinate set and the target path point coordinate set, wherein the second determination signal indicates that the control module of the selected robot is not in normal operation; and H75) by the control module of the selected robot, generating and outputting, based on the direction correcting signal and the target path point coordinate set, a second driving signal to the moving module of the selected robot, so that the moving module of the selected robot is driven to correct a moving direction of the selected robot.

6. A system for environment maintenance, comprising:

a robot system that includes a plurality of movable robots, at least one of which is used to trace and record boundaries of multiple to-be-maintained sites; and a server that is communicatively connected to said robot system via a network, that receives and stores data of the boundaries from the robot system via the network, and that is configured to compute a plurality of moving paths respectively for the to-be-maintained sites based on the data of the boundaries, and to establish a lookup table that records correspondences among the to-be-maintained sites, the boundaries and the moving paths;

wherein said server is configured to receive a setting signal that is generated and transmitted by a mobile device via the network, and the setting signal indicates a target site that is one of the to-be-maintained sites and further indicates a selected robot that is one of said movable robots;

wherein said server is configured to generate a maintenance instruction that indicates a target site boundary and a target moving path based on the setting signal and the lookup table, the target site boundary being one of the boundaries that corresponds to the target site, and the target moving path being one of the moving paths that corresponds to the target site;

wherein said server is configured to transmit the maintenance instruction to said selected robot as indicated by the setting signal to make said selected robot perform maintenance on the target site;

wherein said selected robot is configured to perform maintenance on the target site according to the maintenance instruction, and to transmit working status information that indicates a working status of said selected robot to said server for storage therein;

wherein said server is configured to provide the working status information to the mobile device for display thereby;

wherein each of the boundaries thus recorded includes multiple boundary coordinate sets, and said selected robot includes:

a boundary tracing module configured to trace and record one of the boundaries that corresponds to one of the to-be-maintained sites, and to transmit data of said one of the boundaries to said server via the network;

a positioning module configured to acquire a current coordinate set that represents a current location of said selected robot;

a status reporting module; and a navigation module disposed to receive the maintenance instruction from said server, electrically connected to said positioning module for receiving the current coordinate set therefrom, and electrically connected to said status reporting module;

wherein said navigation module is configured to determine, based on a first coordinate set and the boundary coordinate sets of the target site boundary, whether said selected robot is outside of the target site boundary, the first coordinate set being acquired by and received from said positioning module, and representing a location of said selected robot at a time said navigation module received the maintenance instruction; and wherein said navigation module is configured to, upon determining that said selected robot is outside of the target site boundary, cause said status reporting module to generate and transmit the working status information that includes a first working status to said server for storage therein, the first working status indicating that said selected robot is outside of the target site boundary.

7. The system of claim 6, wherein said selected robot further includes a control module that is electrically connected to said positioning module and said navigation module, and each of the moving paths includes multiple path point coordinate sets;

wherein said positioning module is configured to transmit the current coordinate set to said control module;

wherein said navigation module is configured to, upon determining that said selected robot is not outside of the target site boundary, transmit a target path point coordinate set to said control module, the target path point coordinate set is one of the path point coordinate sets of the target moving path, and the path point coordinate sets of the target moving path are to take turns serving as the target path point coordinate set and be transmitted to said control module one at a time in sequence;

wherein said control module is configured to drive said selected robot to move based on the target path point coordinate set;

wherein said control module is configured to generate a determination output based on the target path point coordinate set and a second coordinate set, and to transmit the determination output to said navigation module, the second coordinate set is acquired by and received from said positioning module and represents a location of said selected robot at a time after said selected robot has been driven to move, and the determination output indicates whether said selected robot has arrived at the target path point coordinate set;

wherein said navigation module is configured to determine, based on the determination output, whether said control module is in normal operation; and wherein said navigation module is configured to, upon determining that said control module is not in normal operation, cause said status reporting module to generate and transmit the working status information that includes a second working status to said server for storage therein, the second working status indicating that said selected robot has not completed a given task.

8. The system of claim 7, wherein said navigation module is configured to, upon determining that said control module is in normal operation, determine whether all of the path point coordinate sets of the target moving path have been transmitted to said control module; and wherein said navigation module is configured to, upon determining that all of the path point coordinate sets of the target moving path have been transmitted to said control module, cause said status reporting module to generate and transmit the working status information that includes a third working status to said server for storage therein, the third working status indicating that said selected robot has completed the given task; and wherein said navigation module is configured to, upon determining that not all of the path point coordinate sets of the target moving path have been transmitted to said control module, transmit to said control module, another one of the path point coordinate sets of the target moving path that is next to said one of the path point coordinate sets of the target moving path and that serve as the target path point coordinate set in place of said one of the path point coordinate sets of the target moving path.

9. The system of claim 7, wherein said selected robot includes a moving module and an environment maintenance module, and said control module is configured to receive the first coordinate set and the target path point coordinate set from said positioning module and said navigation module, respectively;

wherein said control module is configured to generate, based on the first coordinate set and the target path point coordinate set, a direction changing signal that is to direct said selected robot to face a direction of the target path point coordinate set;

wherein said control module is configured to generate and output a maintenance control signal to said environment maintenance module to drive operation of said environment maintenance module; and wherein said control module is configured to generate and output, based on the direction changing signal and the target path point coordinate set, a first driving signal to said moving module, so that said moving module is driven to make said selected robot move toward the target path point coordinate set.

10. The system of claim 7, wherein said control module is configured to receive the second coordinate set;

wherein said control module is configured to determine, based on the second coordinate set, whether said selected robot has arrived at the target path point coordinate set;

wherein said control module is configured to, upon determining that said selected robot has arrived at the target path point coordinate set, generate and transmit the determination output that includes a first determination signal to said navigation module, and cause said status reporting module to generate and transmit working progress information indicating that said selected robot has arrived at the target path point coordinate set to said server for storage therein, the first determination signal indicating that said control module is in normal operation;

wherein said control module is configured to, upon determining that said selected robot has not arrived at the target path point coordinate set, generate and transmit the determination output that includes a second determination signal to said navigation module, and generate a direction correcting signal based on the second coordinate set and the target path point coordinate set, the second determination signal indicating that said control module is not in normal operation; and wherein said control module is configured to generate and output, based on the direction correcting signal and the target path point coordinate set, a second driving signal to said moving module, so that said moving module is driven to correct a moving direction of said selected robot.

* * * * *